United States Patent
Yamamoto

(10) Patent No.: US 8,044,313 B2
(45) Date of Patent: Oct. 25, 2011

(54) PUSH BUTTON SWITCH STRUCTURE

(75) Inventor: Takao Yamamoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 455 days.

(21) Appl. No.: 12/219,739

(22) Filed: Jul. 28, 2008

(65) Prior Publication Data
US 2009/0057114 A1 Mar. 5, 2009

(30) Foreign Application Priority Data

Aug. 27, 2007 (JP) ................................. 2007-220399

(51) Int. Cl.
*H01H 9/00* (2006.01)
(52) U.S. Cl. ........................................ 200/314; 200/341
(58) Field of Classification Search .................... 200/341
See application file for complete search history.

(56) References Cited

U.S. PATENT DOCUMENTS

| | | | | |
|---|---|---|---|---|
| 4,918,270 A | * | 4/1990 | Orrico | 200/302.2 |
| 6,626,473 B1 | * | 9/2003 | Klein et al. | 292/347 |
| 6,809,273 B2 | * | 10/2004 | Ito et al. | 200/5 R |
| 7,075,024 B2 | * | 7/2006 | Maeda et al. | 200/310 |
| 7,164,092 B2 | * | 1/2007 | Kawano | 200/310 |
| 7,285,741 B2 | * | 10/2007 | Kato | 200/513 |
| 7,332,688 B2 | * | 2/2008 | Browne et al. | 200/512 |
| 7,420,136 B2 | * | 9/2008 | Goetzl et al. | 200/341 |

FOREIGN PATENT DOCUMENTS

| | | |
|---|---|---|
| JP | 08-007162 | 1/1996 |
| JP | 2001-006484 | 1/2001 |

* cited by examiner

*Primary Examiner* — Elvin G Enad
*Assistant Examiner* — Lisa Klaus
(74) *Attorney, Agent, or Firm* — Squire, Sanders & Dempsey (US) LLP

(57) ABSTRACT

A push button switch includes a switch casing, and a printed circuit board with a switching element disposed thereupon. A push button is disposed in an opening of the switch casing. The push button includes a pushing portion, pushing projection, and an annular wall portion surrounding a periphery of the pushing projection. The pushing portion, the pushing projection, and the annular wall portion are configured of elastic material. The annular wall portion and the pushing projection are disposed in an interior of the switch casing such that the pushing portion projects outwardly from the opening portion of the switch casing. A distal end portion of the pushing projection is directed toward the switching element. The push button switch also includes a guide member configured to restrict movement of the pushing projection. The guide member is disposed inside the annular wall portion of the push button.

11 Claims, 7 Drawing Sheets

Fig.7
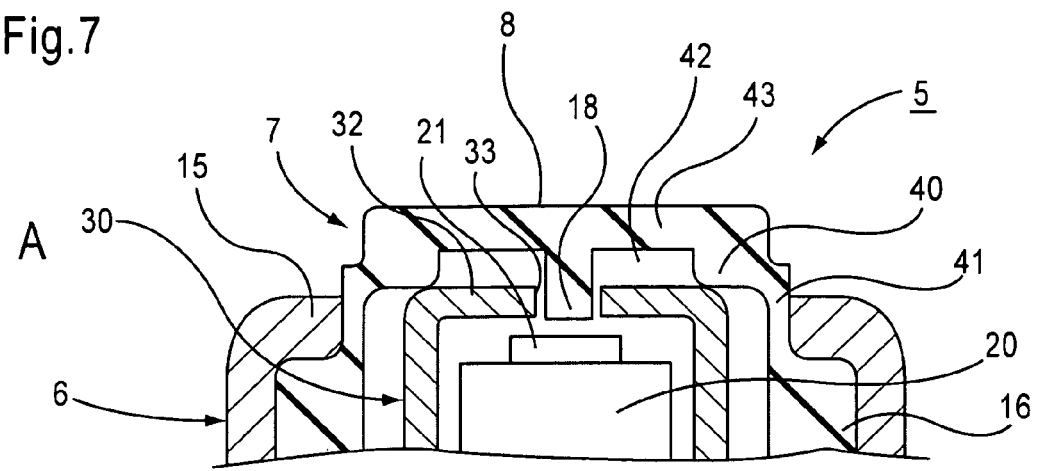
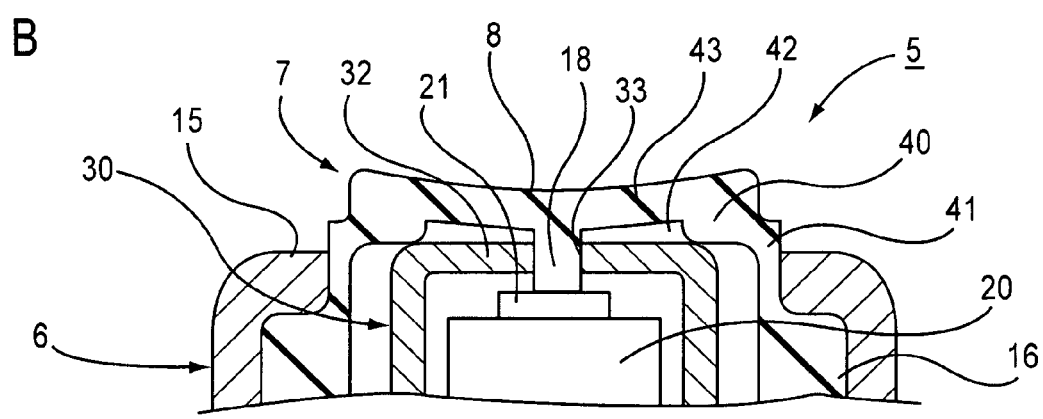
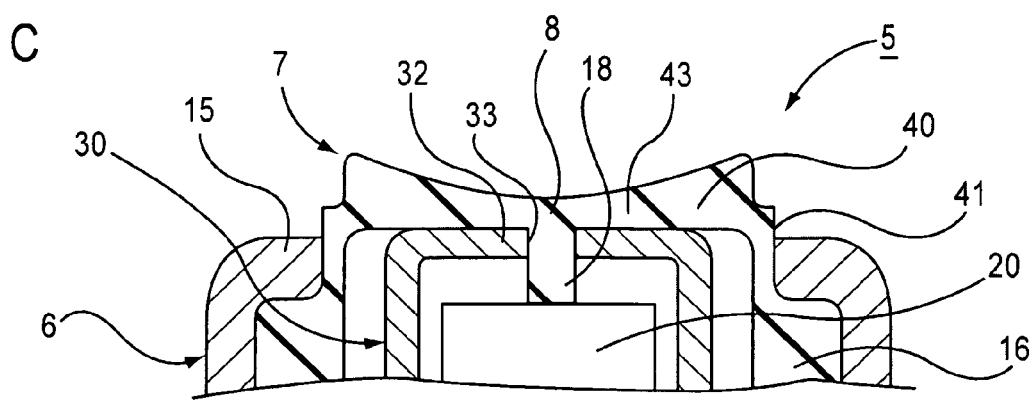

PUSH BUTTON SWITCH STRUCTURE

BACKGROUND ON THE INVENTION

1. Field of the Invention

The present invention relates to a push button switch that can be used, for example, as a kill switch mounted on a handle of a vehicle such as a motorcycle or an all-terrain vehicle.

2. Description of the Related Art

There has been known a push button switch which is configured such that a printed circuit board mounting a tact switch thereon is housed in the inside of a switch casing, the tact switch is covered with a rubber-made pushing member which changes over the tact switch to an ON state or an OFF state, and a push button cap having relatively high rigidity is mounted on the pushing member. The tact switch per se is a kind of push-type switch, which can be small in size and constitutes a switching element in which a contact point arranged in the inside of the switch is turned on by pushing and the switch is turned off when a pushing force is released. That is, the switch constitutes a switching element which is changed over between an ON state and an OFF state due to the pushing operation of the push button cap. Such a configuration is shown, for example, in Japanese Patent document JP-A-8 (1996) '7162.

There also has been known a push button switch which is configured such that a cantilever-type push button is formed by forming a slit in a lid portion which covers an opening portion of a switch casing housing a printed circuit board and a tact switch therein, the tact switch is changed over to an ON state or an OFF state using a pushing projection which is integrally formed on the push button in a projecting manner and, at the same time, a guide wall for restricting the falling of the pushing projection attributed to the movement of the pushing projection is integrally formed on the switch casing. Such a configuration is shown, for example, in Japanese patent document JP-A-2001-6484.

SUMMARY OF THE INVENTION

A push button switch structure can include a switch casing, and a printed circuit board within the switch casing. A switching element can be disposed on said printed circuit board, with the switching element configured to be switched between an ON state and an OFF state. A push button is disposed in an opening of the switch casing. The push button can comprise a pushing portion configured to be pushed by a user, and a pushing projection disposed on an inner surface of the pushing portion, and projecting toward an inner portion of the switch casing. The pushing projection is configured to come into and out of contact with the switching element. An annular wall portion surrounds a periphery of the pushing projection. The pushing portion, the pushing projection, and the annular wall portion are integrally configured of elastic material. The annular wall portion and the pushing projection are disposed in an interior of the switch casing such that the pushing portion projects outwardly from the opening portion of the switch casing. A distal end portion of the pushing projection is directed toward the switching element. The push button switch can also include a guide member configured to restrict movement of the pushing projection. The guide member is disposed inside the annular wall portion of the push button.

In another embodiment, the invention comprises a push button switch structure comprising a casing means, printed circuit means, switching means, and push button means. The push button means is for actuating the switching means, and the push button means comprises a pushing portion for engagement by a user, a pushing projection disposed on an inner surface of the pushing portion, and projecting toward an inner portion of the casing means. The pushing projection is for come into and out of contact with the switching means. An annular wall portion surrounds a periphery of the pushing projection. The pushing portion, the pushing projection, and the annular wall portion can be integrally formed of elastic material. A guide member means can be provided for restricting movement of the pushing projection, and is disposed inside of the annular wall portion of the pushed button means.

In another embodiment, the invention comprises a method of manufacturing a push button structure. The method includes the steps of providing an assembling the elements for the embodiments described above.

BRIEF DESCRIPTION OF THE DRAWINGS

FIG. 7 illustrates an explanatory view of an operation of another embodiment of the invention.

DETAILED DESCRIPTION OF THE PREFERRED EMBODIMENTS

With respect to the push button switch of a type in which the pushing member is covered with the push button cap which constitutes a separate body from above, the whole switch can be undesirably increased in size by an amount corresponding to a size of the push button cap. Further, to cover a gap between the push button cap and the switch casing side arranged around the push button cap, it is necessary to make the push button switch waterproof by further covering the push button cap with an additional waterproof sheet from above. Therefore, the number of parts is increased and, at the same time, a projection quantity of the push button cap toward the outside of the switch casing cannot be increased. Accordingly, it can be difficult to locate the pushing portion and, at the same time, an operation stroke which is a push-down quantity of the pushing member becomes small. In view of such a circumstance, an enhancement of the operability is requested.

With respect to a kill switch mounted on a motorcycle, there may be a case that a rider has to operate the kill switch with his/her finger while wearing a glove put on his/her hand. In such a case, the enhancement of the operability is further requested to realize the miniaturization of the whole push button switch while ensuring some size of the pushing portion for allowing the rider to surely push the pushing portion, to realize a relatively large stroke of the pushing portion for allowing the rider to have clear operation feeling, and to realize an accurate stroke which prevents applying of an excessively large load to the switching element.

Further, also with respect to the push button switch of the type which forms the push button in the lid by cutting, in the same manner as the above-mentioned push button switch, a waterproof sheet for covering the cut slit becomes necessary. Further, due to the cantilever-type structure, a tilting quantity of a distal end of the pushing projection can be increased. Therefore, to acquire an effective stroke for turning on or off the tact switch, it can be necessary to push the push button with increased force thus giving rise to drawbacks that the whole push button switch structure needs to be large and, at the same time, the above-mentioned restriction is imposed on the stroke attributed to the waterproof sheet. Further, to prevent the falling of the pushing projection attributed to the large tilting using the guide member, the operation load is increased. Also from this viewpoint, enhancement of the operability and the miniaturization of the push button switch are desired.

Figure 1:
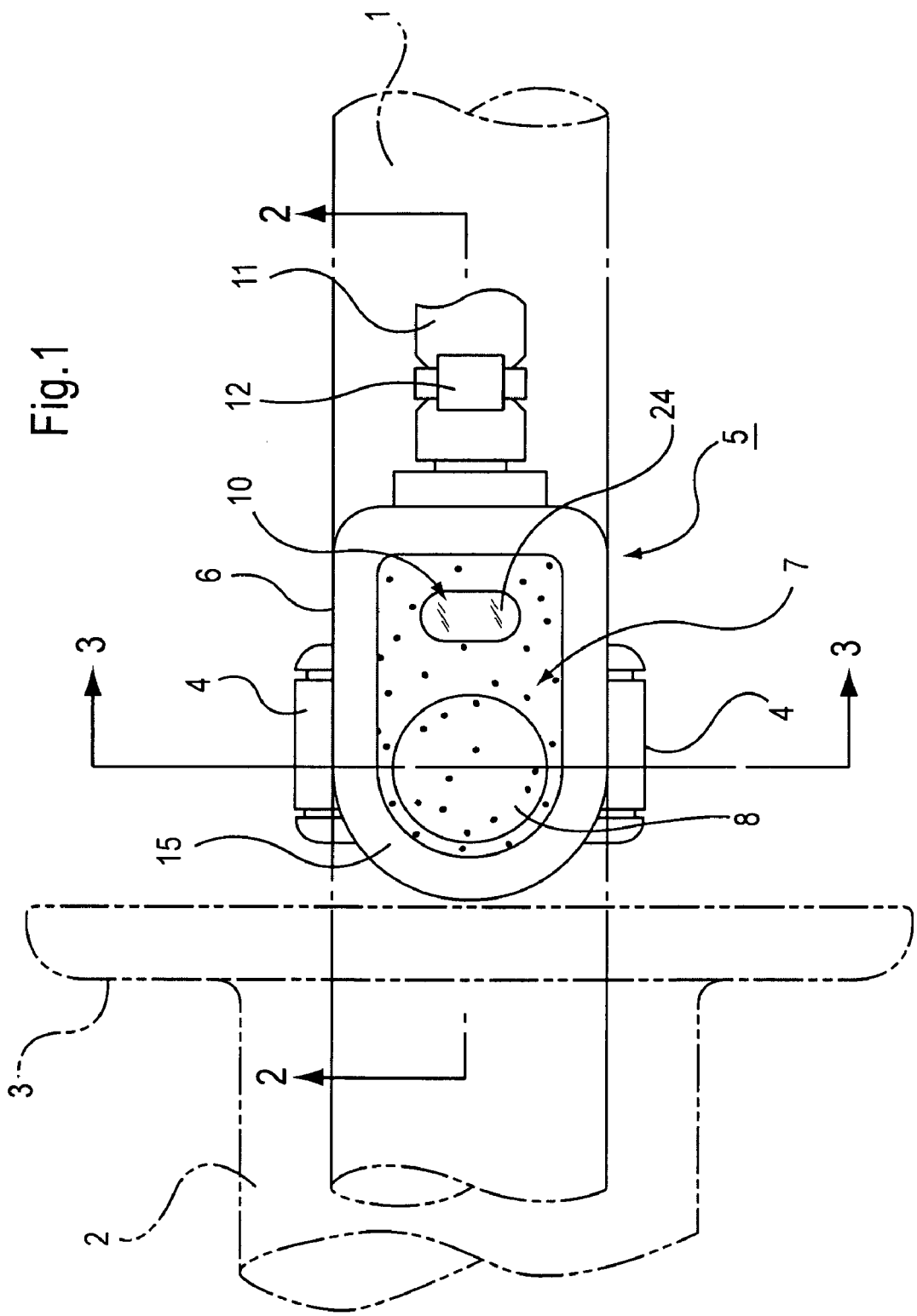
FIG. 1 illustrates a plan view of a kill switch according to one embodiment of the invention in a state that the kill switch is mounted on a handle.
Figure 2:
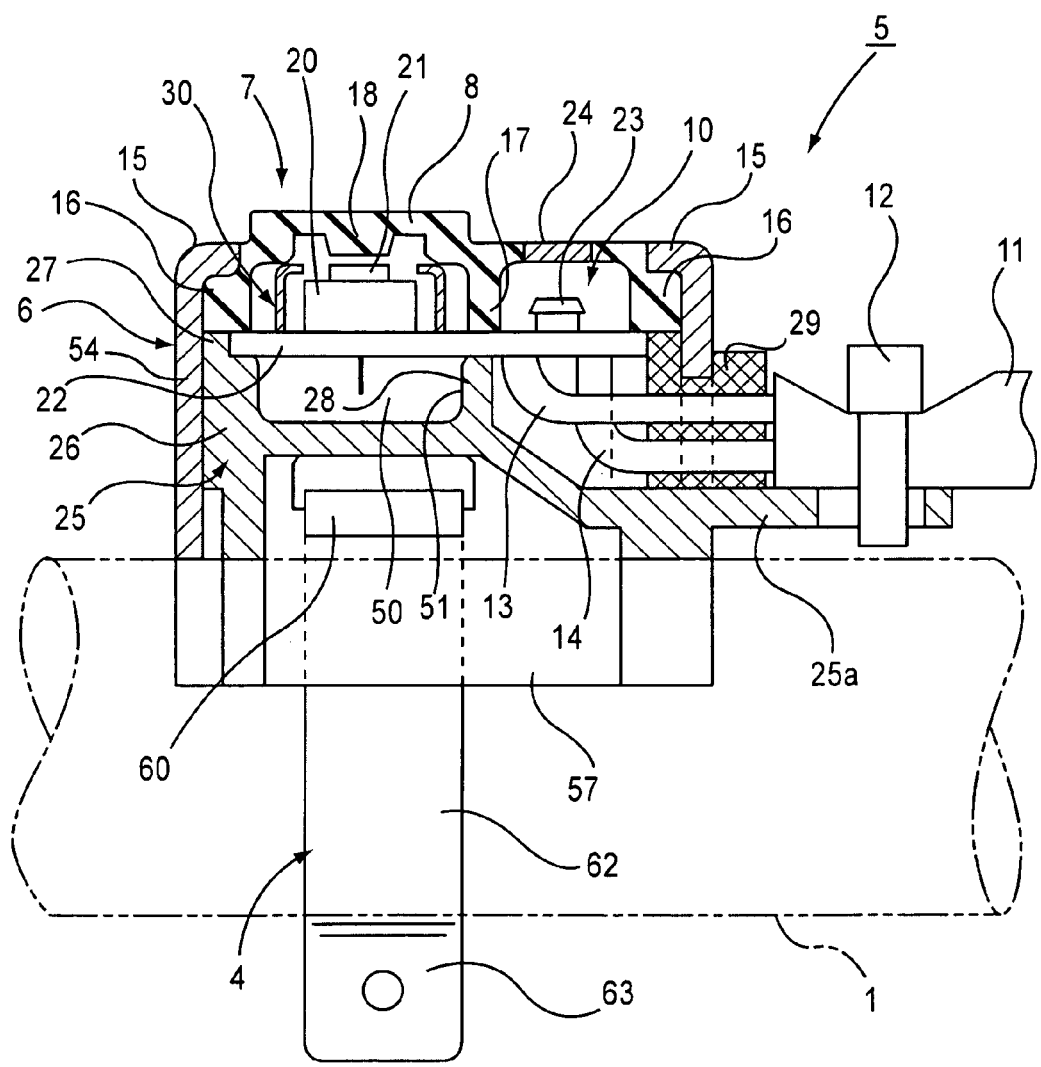
FIG. 2 illustrates a cross-sectional view taken along a line 2-2 in FIG. 1.
Figure 3:
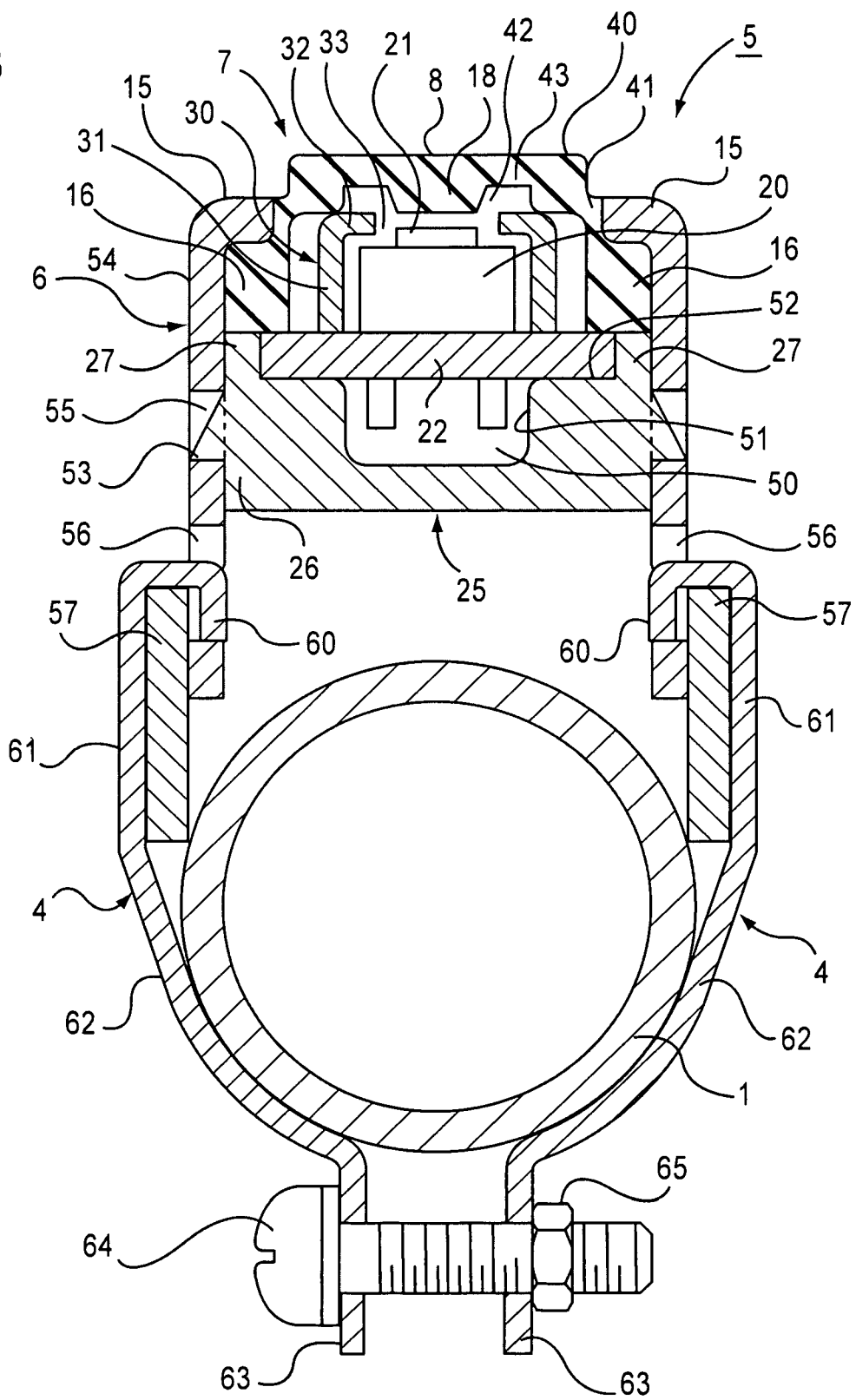
FIG. 3 illustrates a cross-sectional view taken along a line 3-3 in FIG. 1.

FIG. 1 is a plan view of a kill switch according to one embodiment of the invention in a state that the kill switch is mounted on a handle, FIG. 2 is a cross-sectional view taken along a line 2-2 in FIG. 1, and FIG. 3 is a cross-sectional view taken along a line 3-3 in FIG. 1. Here, in the explanation made hereinafter, frontward and rearward directions, leftward and rightward directions, and upward and downward directions indicate the directions based on a mounting and using state of the kill switch on a vehicle body or similar application. To be more specific, the vertical direction on the paper on which FIG. 1 is drawn corresponds to the longitudinal direction of the vehicle, the leftward and rightward directions on the paper on which FIG. 1 is drawn correspond to the leftward and rightward directions of the vehicle, and the upward and downward directions on the paper on which FIG. 2 is drawn correspond to the upward and downward directions of the vehicle.

In FIG. 1, the kill switch 5 is mounted on an inner end portion of a grip 2 which is arranged to cover an end portion of a bar handle 1 of a motorcycle in the vicinity of a flange 3 using a band 4. Although not shown in the drawing, the motorcycle according to the present invention can be a light weight motocross-use motorcycle, and an engine of the motorcycle can be of an electronic fuel injection type.

The kill switch 5 is a switch for shutting down the supply of power source to an ignition device and a fuel injection device near a rider's hand. When the kill switch 5 is turned on or actuated a stop signal is outputted and the supply of power source to the ignition device and the fuel injection device is stopped. Accordingly, the kill switch 5 is normally opened, and is closed only when the kill switch 5 is actuated to output the stop signal. In applications using an electronic fuel injection system, a digital signal is used as a stop signal.

The kill switch 5 includes a push button 7 surrounded by an upper casing 6, and the push button 7 includes a circular pushing portion 8 and an indicator 10. The push button 7 corresponds to an example of a push button of the present invention. The upper casing 6 is a cylindrical body having upper and lower ends thereof open-ended and is made of a suitable material having rigidity such as a resin material or a metallic material. Further, the upper casing 6 has a substantially rectangular shape as a whole as viewed in a plan view, and a short-side portion of the upper casing 6 on a flange 3 side is formed into a semi-circular shape, and the upper casing 6 pushes a periphery of the push button 7 with an upper brim portion 15 thereof.

The push button 7 can be made of a soft elastic body which is easily elastically deformed. That is, the push button 7 can be made of a suitable soft elastic material exhibiting excellent elasticity, insulation property, waterproof, durability and the like including an elastomer resin such as a silicon rubber or a rubber material. The pushing portion 8 has a diameter sufficiently larger than a size of a typical human finger tip for allowing a rider to easily push the pushing portion 8 by his/her finger while wearing a glove on his/her hand.

Item 11 indicates a cord tube which houses a cord described later and extending from the kill switch 5 therein, and item 12 indicates a binding band. The cord tube 11 extends on the bar handle 1 toward the center of a vehicle body from the kill switch 5.

As shown in FIG. 2, the push button 7 is formed of an integral member having in a substantially cap shape and opens downwardly. An outer peripheral portion of the push button 7 forms a thick peripheral wall portion 16. Further, the upper portion of the peripheral wall portion 16 forms a stepped portion which is lower than an exposed upper surface portion of the peripheral wall portion 16 by one step to allow the upper brim portion 15 to push the upper portion of the peripheral wall portion 16. The upper brim portion 15 is formed by folding an upper end portion of the upper casing 6 toward the center of an upper surface of the push button 7 in the substantially horizontal direction.

The pushing portion 8 and the indicator 10 can be arranged inside the upper brim portion 15 in a surrounded manner, and the pushing portion 8 can project outwardly (upwardly in the drawing) higher than the upper brim portion 15.

The inside of the push button 7 is defined by a vertical wall 17 at an intermediate portion between the pushing portion 8 and the indicator 10. The vertical wall 17 forms an annular cylindrical wall together with the peripheral wall portion 16 below the pushing portion 8, and the vertical wall 17 and the peripheral wall portion 16 constitute an annular wall portion in certain embodiments of the present invention.

A pushing projection 18 projecting downwardly in the drawing is integrally formed on an inner side of a center portion of the pushing portion 8. The pushing projection 18 constitutes a thick wall portion of the pushing portion 8, has a thickness which is substantially equal to a sum of a wall thickness of the upper brim portion 15 and a projecting quantity of the pushing portion 8, and exhibits relatively high rigidity necessary as the pushing projection of the kill switch 5. When the pushing portion 8 is pushed, the pushing portion 8 is elastically deformed and is deflected downwardly so that the pushing projection 18 is moved downwardly.

A tact switch 20 which constitutes a switching element suitable for an electronic fuel injection system and outputs a digital signal of 100 mA or less can be disposed below the pushing projection 18. By pushing a projecting portion 21 arranged on a center upper portion of the tact switch 20 in a projecting manner using the pushing projection 18, the tact switch 20 is turned on or actuated. Here, the pushing portion 8 and the annular wall portion are elastically deformed. When a pushing force applied to the pushing portion 8 is released, the pushing projection 18 moves upwardly and restores an original position due to the restoring elasticity of the pushing portion 8 and the annular wall portion and, at the same time, the projecting portion 21 projects upwardly due to a return spring (not shown in the drawing) arranged in the inside of the tact switch 20 and restores an original position and hence, the tact switch 20 is turned off. That is, the kill switch 5 is turned on when an operator pushes the pushing portion 8 with his/her finger, while the kill switch 5 is turned off when the operator releases his/her finger from the pushing portion 8.

The tact switch 20 can be a push-type switch. Various sizes can be implemented. But a preferred embodiment is a small size so as to be unobtrusive on a vehicle such as a motorcycle or all-terrain vehicle. A terminal is directly mounted on a printed circuit board 22. By changing over inner contact points of the tact switch 20, a kill switch circuit arranged on the printed circuit board 22 is changed over. In this embodiment, the tact switch 20 is normally open so that the kill switch circuit is opened when the tact switch 20 is opened. Power is supplied to an ignition circuit of the engine by turning on a main switch to connect a power source. When the tact switch 20 is turned off, the kill switch circuit is closed and outputs a stop signal. In response to this stop signal, the supply of power to the ignition circuit is stopped and hence, even when the main switch is turned on, the ignition of the engine is momentarily stopped.

An LED 23 can constitute an indicator-use light source can also be mounted on the printed circuit board 22. The LED 23 is turned on when the tact switch 20 is in an ON state to display an ON state of the kill switch 5. The indicator 10 is an LED indicator, and a lens 24 can be preliminarily integrally mounted on an upper surface of the push button 7 in the vicinity of the pushing portion 8. Lens 24 can be clear or of a desired color, such as orange. When the LED 23 is turned on, the indicator 10 performs an alarm display. By forming the indicator-use light source using the small-type LED 23, it is possible to miniaturize the indicator 10. As a result, the kill switch 5 and the indicator which displays an operation state of the kill switch 5 can be integrally formed with each other. Accordingly, compared to a case in which the indicator is provided separately from the kill switch, it is possible to simplify the structure of the push button switch and hence, the number of parts can be reduced thus facilitating the mounting of the push button switch on the handle. The LED indicator 10 can also indicate a trouble mode of the electronic fuel injection system.

Into the inside of a side wall 54 of the upper casing 6, a lower casing 25 made of a suitable rigid material such as a resin material is hermetically fitted from below such that the upper casing 6 and the lower casing 25 are integrally formed with each other and form a hermetic seal. The printed circuit board 22 can be disposed on a support wall 26 of the lower casing 25, and the printed circuit board 22 can be pushed down by a lower end portion of the peripheral wall portion 16 and a lower end portion of the vertical wall 17 from above. In such a state, when the peripheral wall portion 16 is pushed downwardly in the drawing by the upper brim portion 15, since the peripheral wall portion 16 is formed of an elastic body, the peripheral wall portion 16 can be deformed and brought into close contact with an upper portion of the indicator 10 and an upper portion of the flange 27 formed on a periphery of the lower-casing support wall 26, thus fixing and sealing the printed circuit board 22 by clamping.

An intermediate wall 28 is integrally formed on the lower casing 25 at a position corresponding to the vertical wall 17, and the intermediate wall 28 clamps an intermediate portion of the printed circuit board 22 together with the vertical wall 17.

A cord-leading opening can be formed in the side wall 54 of the upper casing 6 and a vehicle inner portion of the lower-casing support wall 26, and a grommet 29 is hermetically fitted in the cord-leading opening so as to seal the cord-leading opening. Then, cords 13, 14 extend outwardly from the grommet 29 and enter the inside of the cord tube 11, and are integrally bundled using an arm portion 25a which integrally extends from the lower casing 25 using a binding band 12. One end of the cord 13 and the cord 14 are connected to the printed circuit board 22, wherein the cord 13 is provided for fetching a stop signal to the tact switch 20 and the cord 14 is provided for supplying electricity to turn on the LED 23. The electricity is controlled based on the stop signal.

Figure 4:
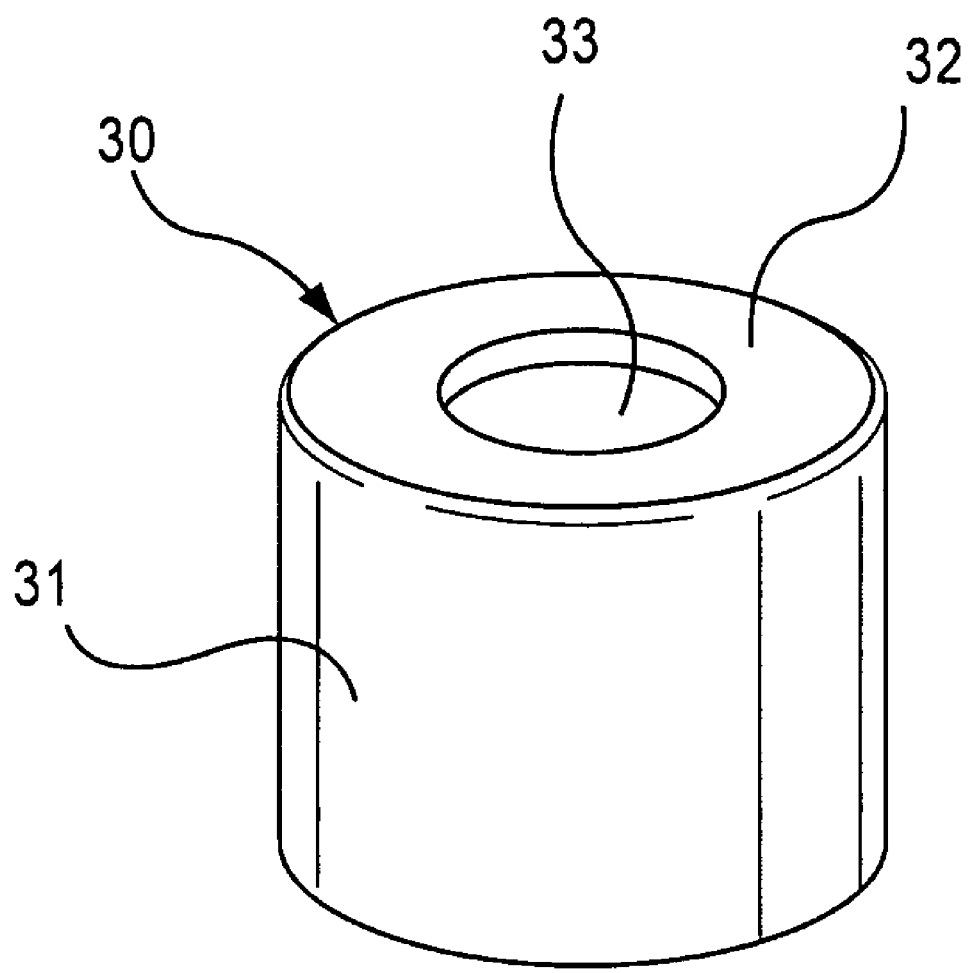
FIG. 4 illustrates a perspective view of a guide member according to one embodiment.

As can be clearly understood from FIG. 3, a guide member 30 can be disposed inside the pushing portion 8 and around the tact switch 20. As shown in FIG. 4, which is a perspective view, the guide member 30 is formed of a bottomed sleeve-shaped member made of a suitable material having rigidity such as metal. The guide member 30 is disposed with a bottom portion thereof positioned at an upper side. The guide member 30 includes a sleeve portion 31 which constitutes an annular vertical wall portion and a ceiling portion (bottom portion) 32 which constitutes a lateral wall portion arranged to cover a one-end opening formed in the sleeve portion 31. A center hole 33 is formed in a center portion of the ceiling portion 32 in a penetrating manner.

Returning to FIG. 3, the guide member 30 is disposed outside the tact switch 20 in a surrounding manner, and has a lower end portion thereof mounted on the printed circuit board 22. The sleeve portion 31 extends in the vertical direction substantially parallel to an outer surface (surface facing in the lateral and longitudinal directions) of the tact switch 20 and an inner surface of the peripheral wall portion 16. A gap is formed between the sleeve portion 31 and the side surface of the tact switch 20, and a gap is formed between the sleeve portion 31 and the side surface of the peripheral wall portion 16.

Above the tact switch 20, the ceiling portion 32 extends over the tact switch 20. The projecting portion 21 can be disposed inside the center hole 33, and the pushing projection 18 which is arranged to face the projecting portion 21 from above in an opposed manner is configured to enter into or retract from the center hole 33.

An outer peripheral portion 40 of the pushing portion 8 is connected with an upper end portion of the peripheral wall portion 16 by way of a thin wall portion 41. Since the thin wall portion 41 is easily deflected by elastic deformation when the pushing portion 8 is pushed, the pushing operation can be smoothly performed with a small operation load.

An outer diameter of the outer peripheral portion 40 is set larger than an outer diameter of the guide member 30 and an inner diameter of the outer peripheral portion 40 is set smaller than an outer diameter of the guide member 30. Due to such configuration, an inner portion of the outer peripheral portion 40 is brought into contact with an outer peripheral portion of the ceiling portion 32 thus pushing and fixing the guide member 30 to the printed circuit board 22. An annular groove 42 can be formed between the outer peripheral portion 40 and the pushing projection 18 thus also facilitating the movement of the pushing projection 18 at the time of pushing the pushing projection 18. The thin wall portion 43 is positioned above the ceiling portion 32, and a gap is formed between the ceiling portion 32 and a portion of the outer peripheral portion 40 outside a contact portion of the outer peripheral portion 40 with the ceiling portion 32, and a gap is formed between the ceiling portion 32 and the thin wall portion 41 thus allowing the elastic deformation of these portions.

A recessed portion 50, slightly larger than the tact switch 20, can be formed in a center portion of the lower casing 25, and a periphery which surrounds the recessed portion 50 forms the lower casing support wall 26 having a large wall thickness. In the portion having such a cross section, the lower casing support wall 26 has a large wall thickness, and includes an inner wall portion 51 which faces the recessed portion 50 and a flat support surface 52 on which an outer peripheral portion of the printed circuit board 22 is placed. The flange 27 having a small wall thickness projects around the support surface 52.

The support surface 52 expands to the lower extension of the sleeve portion 31 such that the support surface 52 can support not only the outer peripheral portion of the printed circuit board 22 but also a lower portion of the guide member 30 on the printed circuit board 22. That is, an inner surface of the inner wall portion 51 and an inner surface of the sleeve portion 31 can be disposed at the substantially same position. However, there is no restriction in projecting the inner wall portion 51 toward the center side than the position of the inner surface of the sleeve portion 31.

Pawls 53 can be integrally formed on a periphery of a side surface of the lower casing 25, and the pawls 53 can be engaged with engaging holes 55 formed in a side wall 54 of the upper casing 6. Positions of the pawls 53 and the engaging holes 55 are set such that the printed circuit board 22 can be sandwiched between the peripheral wall portion 16 and the lower casing 25 in a state that the upper portion of the peripheral wall portion 16 is hermetically brought into close contact with the outer peripheral portion of the printed circuit board 22 and the flange 27 due to strong pushing of the upper brim portion 15 to an upper portion of the peripheral wall portion 16 at the time of the engagement, thus assuring sufficient sealing by a lower portion of the peripheral wall portion 16.

A lower portion of the side wall 54 of the upper casing 6 can extend downwardly in an elongated manner from a lower portion of the lower casing 25, and a band stop hole 56 is formed in an extending portion of the lower portion. Further, stop plates 57 are integrally formed on the lower portion of the side wall 54 of the upper casing 6 by welding or the like such that the stop plates 57 cover approximately lower half side portions of the band stop holes 56. The band stop holes 56 and the stop plates 57 are respectively arranged in pairs in the lateral direction. Approximately U-shaped stop portions 60 which are formed in respective upper end portions of the pair of lateral bands 4 in a bent shape and open downwardly are engaged with the respective lateral band stop holes 56. The stop portions 60 are bent in an approximately U-shape along upper end portions of the stop plates 57, and distal end sides of the stop portions 60 enter the band stop holes 56. Accordingly, the stop portions 60 are engaged with the stop plates 57.

The band 4 can be formed, for example, of a metal plate member, and includes an upper portion 61, an intermediate portion 62 and a lower portion 63 which are continuously and integrally formed with each other. The upper portion 61 is a portion which extends along a side surface of the stop plate 57 and forms the stop portion 60 on a distal end thereof. The intermediate portion 62 is a portion which is formed in an arcuate shape to follow an outer periphery of the bar handle 1. The lower portion 63 is a portion which is bent from a lower end of the intermediate portion 62 and extends in the radially outward direction of the bar handle 1. By arranging the lateral lower portions 63 to face each other in parallel, extending a bolt 64 between the lower portions 63, and fastening the lower portions 63 with a nut 65, lower ends of the stop plates 57 are brought into contact with the outer periphery of the bar handle 1 thus firmly fixing the kill switch 5 to the bar handle 1.

Figure 5:
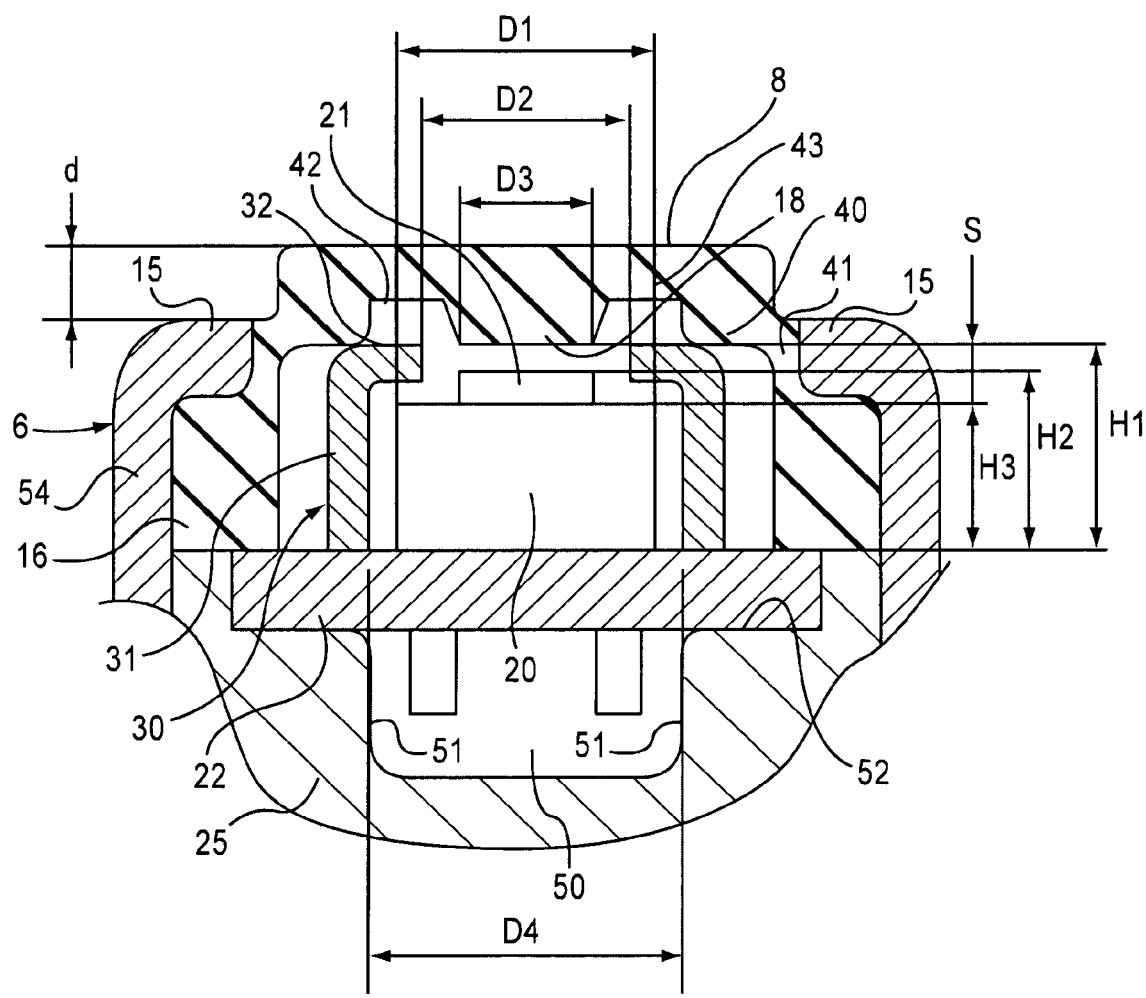
FIG. 5 illustrates a schematic view showing a size relationship among parts of one embodiment.

FIG. 5 is a view which shows an enlargement of a portion of the same cross-sectional portion shown in FIG. 3, and shows the size relationship among the pushing portion 8, the tact switch 20, the guide member 30 and the lower casing support wall 26. An upper surface of the pushing portion 8 is flat and projects upwardly from an upper surface of the upper brim portion 15 by a height d in the drawing. The projection quantity d in this embodiment is substantially equal to a wall thickness of the upper brim portion 15. However, the projection quantity d is not always related with the wall thickness of the upper brim portion 15, and can be determined based upon the specific needs of an application, such as considering when a rider operates the push button switch with his/her finger while wearing a glove on his/her hand.

Assuming the outer diameter of the tact switch 20 as D1, a diameter of the center hole 33 formed in the guide member 30 (that is, the inner diameter of the ceiling portion 32) as D2, an outer diameter of a distal end portion of the pushing projection 18 as D3, and an inner diameter of the sleeve portion 31 as D4, the relationship of D4>D1>D2>D3 is established. Here, the outer diameter D3 of the projection portion 21 is substantially equal to an outer diameter of the projection portion 21.

Further, the inner diameter D4 of the sleeve portion 31 is substantially equal to an inner diameter of the inner wall portion 51. It is possible to make the diameters D2 and D3 close to each other as much as possible. The closer the diameters D2 and D3 are arranged to each other, the pushing projection 18 can be more accurately guided by the ceiling portion 32 at the time of performing the pushing operation and hence, the falling of the pushing projection 18 can be reduced. By making the inner diameters of the sleeve portion 31 and the inner wall portion 51 agree with the diameter D4, a pushing load applied to the guide member 30 from the pushing portion 8 can be received by a lower casing support wall 26 side thus reducing a load applied to the printed circuit board 22.

Further, with the printed circuit board 22 used as the reference, assuming a height of the guide member 30 from the printed circuit board 22 (corresponding to a size from an upper surface of the printed circuit board 22 to an upper surface of the ceiling portion 32) as H1, a height of the projection portion 21 from the printed circuit board 22 at the time of non-operation (with the pushing projection 18 being in a free separated state) as H2, and a height of an upper surface of the tact switch 20 around the projection portion 21 of the tact switch 20 from the printed circuit board 22 (the height of the upper surface of the tact switch 20 when the projection portion 21 is pushed) as H3, the relationship of H1>H2>H3 is established, and the projection portion 21 is retracted downwardly from an upper surface of the ceiling portion 32. Due to such configuration, when the pushing projection 18 is brought into contact with the projecting portion 21, the pushing projection 18 is guided by the ceiling portion 32.

Further, the difference between the heights H1 and H3 becomes a stroke S necessary for pushing. A size of the stroke S is set by, for example, considering a desired feel of the switch operation, as it would be perceived by a user.

Figure 6:
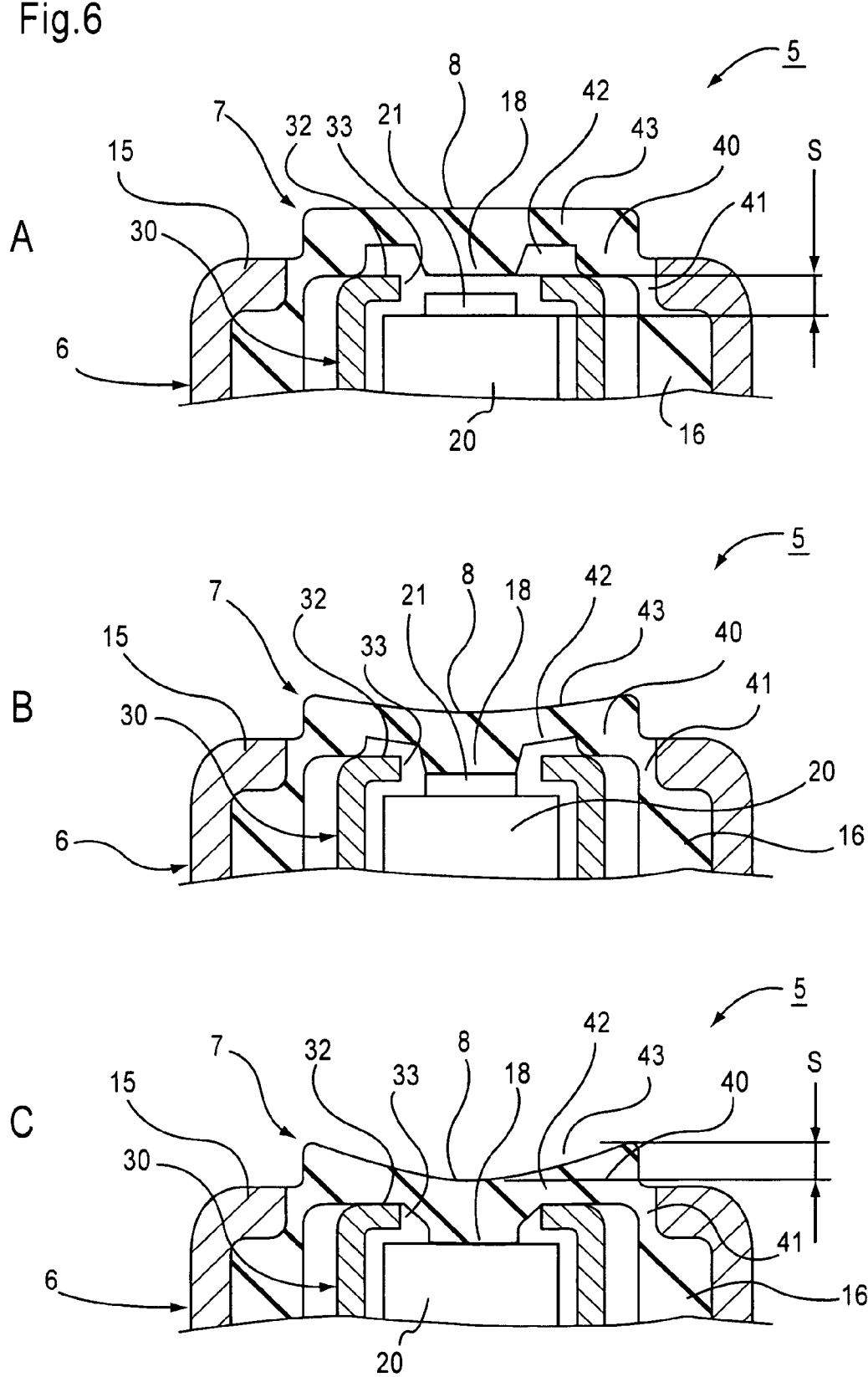
FIG. 6 illustrates an explanatory view of an operation of one embodiment of the invention.

Next, the manner of operation of this embodiment is explained. FIG. 6 shows a change caused by the operation of the pushing portion 8. First of all, in a non-pushed or non-actuated state of the pushing portion 8 indicated by symbol A, the predetermined stroke S is formed between the pushing projection 18 and the projecting portion 21 and hence, a large space is formed by the annular groove 42 above the ceiling portion 32.

Symbol B indicates a state in which the pushing portion 8 is pushed. Due to the elastic deformation of the pushing portion 8 which is the elastic member, a large stroke corresponding to the stroke S is acquired and hence, the pushing projection 18 enters the inside of the center hole 33 while being guided by the ceiling portion 32, and is brought into contact with the projecting portion 21 so as to push down the projecting portion 21. At this stage of operation, the switch changeover of the tact switch 20 is in a transitional state and, therefore, the changeover is less than the stroke S whereby the tact switch 20 is still in an OFF state. In this state, the space defined by the annular groove 42 still remains in the vicinity of the ceiling portion 32.

Symbol C indicates a state in which the pushing portion 8 is pushed by the stroke S so as to push down the projecting portion 21 by a predetermined quantity; hence, the tact switch 20 is changed over to an ON state. In this state, the pushing portion 8 is deformed downwardly in a curved shape; therefore, a portion of the pushing portion 8 around the annular groove 42 is deformed and is pushed to the ceiling portion 32 with no gap. When the pushing portion 8 is further pushed from such a state, unless the guide member 30 is provided, an excessively largely load can be applied to the tact switch 20. However, the pushing portion 8 is supported by the guide member 30; therefore, the excessively large load applied to the pushing portion 8 is received by the lower casing 25 by way of the guide member 30 whereby it is possible to prevent the excessively large load from being applied to the tact switch 20. Further, the printed circuit board 22 is also supported on the support surface 52 up to the lower portion of the guide member 30 and hence, the excessively large load applied to the printed circuit board 22 can be also reduced (see FIG. 5).

In this manner, the bottomed cylindrical guide member 30 having the simple structure is housed and arranged in the inside of the push button 7. Therefore, the push button switch is configured such that the tact switch 20 and the guide member 30 are covered with the push button 7 from the outside whereby the tact switch 20 and the guide member 30 can be made waterproof by the push button 7. In this manner, different from the conventional type which requires the waterproof sheet outside the push button, this embodiment can eliminate such a waterproof sheet. Therefore, the pushing portion 8 can project more significantly from the upper surface of the upper casing 6. The stroke of the pushing portion 8 in the pushing button 7 can therefore be increased. Further, while making the whole push button switch small size, the size of the pushing portion 8 can be increased to an extent that the rider can easily operate the pushing portion 8 with his/her finger while wearing a glove on his/her hand, resulting in improved operability.

Further, even when the pushing portion 8 is strongly and excessively pushed, a stage that the pushing projection 18 is pushed by the predetermined stroke, the pushing portion 8 is received by the guide member 30 thus preventing the further pushing of the pushing portion 8 and, at the same time, preventing an excessive load from being applied to the tact switch 20. Accordingly, even when the rider wears the glove on his/her hand, the rider can easily operate the pushing portion 8 with his/her finger and, therefore, the large stroke which surely gives the operation feeling to the rider can be formed whereby the push button switch can be preferably used as the kill switch of the motorcycle.

Further, the guide member 30 is formed of the simple bottomed cylindrical member and the pushing projection 18 can enter into or retract from the center hole 33 formed in the ceiling portion 32. As a result, the falling of the pushing projection 18 at the time of operating the pushing projection 18 can be prevented. Further, the guide member can have the simple structure and can be relatively small in size.

Accordingly, due to the elastic deformation of the push button 7, the push button switch can ensure the large stroke and, at the same time, the tact switch 20 which is small-sized and exhibits relatively small resistance against the excessively large operation load can be used as a switch element which outputs a digital signal suitable for an electronic fuel injection system whereby the push button switch can be preferably used as a kill switch of a motocross-use motorcycle or all-terrain vehicle which adopts the electronic fuel injection system and is required to be light-weighted. It is needless to say, however, that the push button switch of this embodiment is applicable various vehicles other than motorcycles and all-terrain vehicles.

Further, the push button 7 and the printed circuit board 22 are sandwiched between the lower casing 25 and the upper casing 6, the peripheral wall portion 16 is brought into close contact with the periphery of the printed circuit board 22, and the upper brim portion 15 and the flange 27 are sealed to each other liquid-hermetically and hence, a waterproof sealing can be provided by making use of the elasticity of the peripheral wall portion 16. Accordingly, different from the conventional type which requires the waterproof sheet for covering the push button, this embodiment can eliminate such a waterproof sheet and hence, even when a projection quantity of the pushing portion 8 with respect to the upper casing 6 is increased, it is possible to surely perform sealing and hence, the number of parts can be reduced by an amount corresponding to the elimination of the particular sealing member.

Further, by adopting a small LED such as LED 23 as the light source of the indicator, the tact switch 20 and the indicator 10 can be integrally mounted on the common printed circuit board 22 and hence, the kill switch device constituted of the kill switch 5 and the indicator 10 can be miniaturized. Further, the LED 23 can be housed in the inside of the common lower casing 25, upper casing 6 and pushing button 7 and hence, it is unnecessary to provide these parts independently for the indicator 10, thus enabling the reduction of the number of parts.

FIG. 7 is a view showing a modification and corresponds to FIG. 6. In this modification, the pushing portion 8 further largely projects upwardly such that the ceiling portion 32 of the guide member 30 is at a position substantially equal to a position of the upper brim portion 15 of the upper casing 15. The diameter of the pushing projection 18 is set considerably smaller than the outer diameter of the projecting portion 21, and the pushing projection 18 is formed in a considerably elongated manner compared to the projecting portion 21. Further, the center hole 33 has the diameter smaller than the outer diameter of the projecting portion 21, and the ceiling portion 32 projects over the projecting portion 21. The pushing projection 18 penetrates the center hole 33 and projects downwardly. The projecting portion 21 is arranged at a position extended downwardly from the ceiling portion 32.

In a free or unactuated state indicated by symbol A, the pushing projection 18 enters the center hole 33 and a clearance is formed between the center hole 33 and the projecting portion 21.

In a transitional state indicated by symbol B in which the pushing portion 8 is pushed downwardly, the pushing projection 18 is guided by the ceiling portion 32 without being inclined and pushes the projecting portion 21 downwardly.

In a state C in which the projecting portion 21 is pushed down by a predetermined quantity and the tact switch 20 is changed over to an ON state, the pushing portion 8 is largely curved downwardly to be into close contact with the ceiling portion 32. When the pushing portion 8 is further pushed downwardly from such a state, an excessively large load is received by the guide member 30; therefore, it is possible to prevent the excessively large load from being applied to the tact switch 20. In this modification, even when the pushing projection 18 is formed in a fine elongated shape, the falling of the pushing projection 18 at the time of operation can be surely prevented thus allowing the pushing portion 8 to be more easily elastically deformed and to project more largely upwardly thus enhancing the operability of the push button switch.

In one embodiment, the whole push button is integrally formed of the elastic material, and the guide member is arranged and housed in the inside of the push button and hence, it is possible to make the guide member small-sized.

Further, the switching element and the guide member are respectively covered with the push button from the outside and hence, it is possible to allow the push button switch per se to exhibit the waterproof performance. Accordingly, different from the conventional push button switch, it is unnecessary to arrange the waterproof sheet outside the push button and hence, the waterproof sheet can be omitted whereby it is possible to allow the pushing portion to largely project from the casing thus increasing a stroke of the push button.

Further, the push button is not covered with the button cap from the outside and, therefore, it is possible to make the pushing portion large-sized while miniaturizing the whole push button switch by an amount corresponding to the elimination of the button cap. Accordingly, operability of the push button switch can be enhanced as a whole.

According to another embodiment, the guide member is configured such that the guide member includes the sleeve portion and the ceiling portion which is arranged to cover the one-end-side opening of the sleeve portion, and the pushing projection is configured to enter into or retract from the opening formed in the ceiling portion and, therefore, it is possible to prevent an excessively large stroke by the guide member and, at the same time, it is possible to prevent the falling of the pushing projection at the time of operating the push button switch. Further, the structure of the guide member can be simplified thus realizing the miniaturization of the push button switch.

According to another embodiment, the pushing button formed of the elastic member and the printed circuit board are arranged between the lower casing and the upper casing in a sandwiched manner and hence, it is possible to seal the printed circuit board using the push button. Accordingly, by making use of the elasticity of the pushing portion, the pushing portion also functions as a waterproof sheet and, therefore, the waterproof sheet required by the prior art can be eliminated whereby the number of parts can be reduced.

According to yet another embodiment, by adopting the small-sized LED indicator, the switching element and the LED indicator can be integrally mounted on the printed circuit board and hence, it is possible to realize the miniaturization of whole kill switch device constituted of the kill switch and the indicator.

The present invention is not limited to the above-mentioned respective embodiments, and various modifications and variations are conceivable within the spirit and scope of the present invention. For example, the switch which is subject to the present invention is not limited to a switch for a motorcycle and is applicable to kill switches of various vehicles.

Further, the switch element is not limited to the tact switch, and other switch elements can be used provided that the switch can change over the contacts by pushing the pushing portion 8.

DESCRIPTION OF REFERENCE NUMERALS AND SIGNS

1: bar handle
5: kill switch
6: upper casing
7: push button
8: pushing portion
16: peripheral wall portion
18: pushing projection
20: tact switch
21: projecting portion
22: printed circuit board
25: lower casing
30: guide member

I claim:

1. A push button switch, comprising:
   a switch casing;
   a printed circuit board within said switch casing;
   a switching element disposed on said printed circuit board, said switching element configured to be switched between an ON state and an OFF state; and
   a push button disposed in an opening of the switch casing, said push button comprising;
      a pushing portion configured to be pushed by a user,
      a pushing projection disposed on an inner surface of the pushing portion, and projecting toward an inner portion of the switch casing, wherein the pushing projection is configured to come into and out of contact with the switching element, and
      an annular wall portion surrounding a periphery of the pushing projection,
      wherein the pushing portion, the pushing projection, and the annular wall portion are integrally configured of elastic material,
      wherein the annular wall portion and the pushing projection are disposed in an interior of the switch casing such that the pushing portion projects outwardly from the opening portion of the switch casing, and
      wherein a distal end portion of the pushing projection is directed toward the switching element,
   said push button switch further comprising
      a guide member configured to restrict movement of the pushing projection, said guide member disposed inside the annular wall portion of the push button,
      wherein the guide member comprises a sleeve portion extending along an inner side of the annular wall portion, and a ceiling portion configured to cover an opening of the sleeve portion, extending along an inner side of the pushing portion with a gap therebetween, and extending over the switching element,
      wherein the guide member is arranged outside the switching element in a surrounding manner, and comprises a lower end portion thereof mounted on the printed circuit board, and
      wherein the pushing projection is configured to be moved into and out of an opening in the ceiling portion.

2. A push button switch as recited in claim 1, wherein the switch casing comprises a lower casing and an upper casing, and wherein the push button and the printed circuit board are disposed between the lower casing and the upper casing.

3. A push button switch as recited in claim 1, further comprising:
   an LED indicator disposed on the printed circuit board.

4. A push button switch structure, comprising:
   casing means for encasing switch components;
   supporting means disposed within the casing means, said supporting means for supporting electronic components thereupon;
   switching means disposed on said supporting means, said switching means for switching between ON state and OFF state; and
   actuating means disposed in an opening of the casing means, said actuating means for actuating the switching means, said actuating means comprising a pushing portion for engagement by a user, a pushing projection disposed on an inner surface of the pushing portion and projecting toward an inner portion of the casing means, wherein the pushing projection is for coming into and out of contact with the switching means, and an annular wall portion surrounding a periphery of the pushing projection, wherein the pushing portion, the pushing projection, and the annular wall portion are integrally formed of elastic material, and wherein the annular wall portion and the pushing projection are disposed in an interior of the casing means such that the pushing portion projects outwardly from the opening portion of the casing means and a distal end portion of the pushing projection is directed toward the switching means, said push button switch structure further comprising guiding means for restricting movement of the pushing projection, said guiding means disposed inside the annular wall portion of the actuating means, wherein the guiding means comprises a sleeve portion extending along an inner side of the annular wall portion, and a ceiling portion configured to cover an opening of the sleeve portion, extending along an inner side of the pushing portion with a gap therebetween, and extending over the switching means, and wherein the guiding means is arranged outside the switching means in a surrounding manner, and comprises a lower end portion thereof mounted on the supporting means, and wherein the pushing projection is configured to be moved into and out of an opening in the ceiling portion.

5. A push button switch as recited in claim 4, wherein said guiding means comprises a sleeve portion extending along an inner side of the annular wall portion, and a ceiling portion configured to cover an opening of the sleeve portion, and extending along an inner side of the pushing portion with a gap therebetween, and wherein the pushing projection is configured to be moved into and out of opening in the ceiling portion.

6. The push button switch as recited in claim 4, wherein the casing means comprises a lower casing and an upper casing, and wherein the actuating means and the supporting means are disposed between the lower casing and the upper casing.

7. A push button switch as recited in claim 4, further comprising:

an indicating means disposed on the supporting means, said indicating means for providing visual indication of operation mode.

8. A method of assembling a switch, comprising:

providing a switch casing, and a printed circuit board disposed within said casing, wherein a switching element is disposed on the printed circuit board;

providing a push button which is configured to be disposed in an opening of the switch casing, with the push button including a pushing portion configured to be pushed by a user, and a pushing projection on an inner surface of the pushing portion, wherein the pushing projection is configured, when the push button is disposed in the switch casing, to project toward an inner portion of the switch casing, wherein the pushing projection is configured to come into and out of contact with the switch element, wherein an annular wall portion surrounds a periphery of the pushing projection, and wherein the pushing portion, the pushing projection, and the annular wall portion are integrally configured of elastic material;

providing a guide member attached to said switching casing; and placing the push button in the opening of the switch casing, such that the annular wall portion and the pushing projection are disposed in an interior of the switch casing such that the pushing portion projects outwardly from the opening of the switch casing, and a distal end portion of the pushing projection is directed toward the switch element, wherein the guide member restricts movement of the pushing projection during switch actuation, wherein the guide member comprises a sleeve portion extending along an inner side of the annular wall portion, and a ceiling portion configured to cover an opening of the sleeve portion, extending along an inner side of the pushing portion with a gap therebetween, and extending over the switching element, wherein the guide member is arranged outside the switching element in a surrounding manner, and comprises a lower end portion thereof mounted on the printed circuit board, and wherein the pushing projection is configured to be moved into and out of an opening in the ceiling portion.

9. A method as recited in claim 8, wherein providing said guide portion comprises providing a sleeve portion extending along an inner side of the annular wall portion, and providing a ceiling portion which covers an opening of the sleeve portion, and which extends along an inner side of the pushing portion with a gap therebetween.

10. A method as recited in claim 8, wherein providing the switch casing comprises providing a lower casing and an upper casing, wherein the push button and the printed circuit board are disposed between the lower casing and the upper casing.

11. A method as recited in claim 8, further comprising providing an LED indicator on the printed circuit board.

* * * * *